Patented Dec. 29, 1931

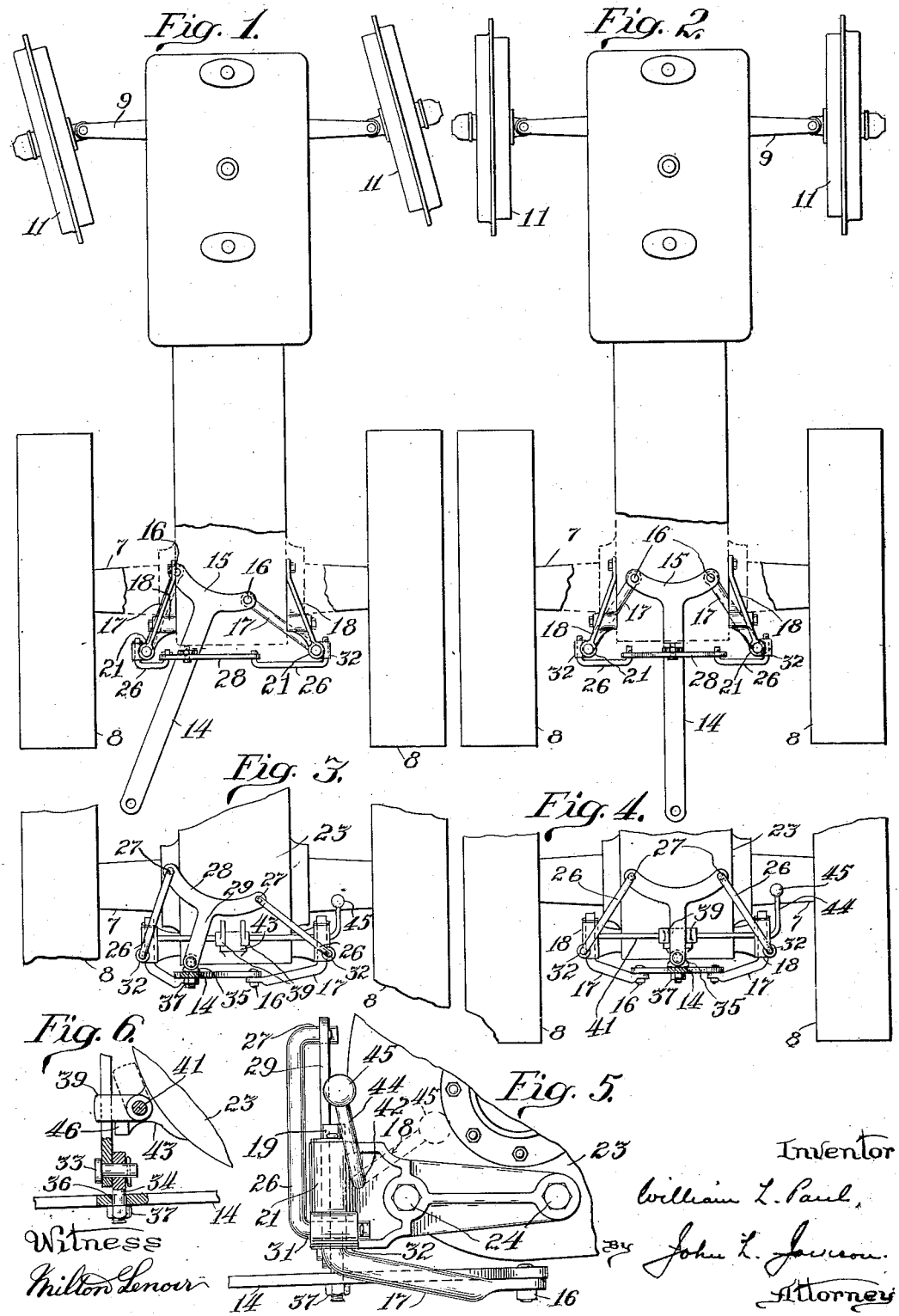

1,838,865

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

DRAFT ATTACHMENT FOR TRACTORS

Application filed November 18, 1926. Serial No. 149,202.

The present invention relates to draft attachments for tractors, and embodies improvements upon the construction of draft attachment disclosed in my copending application, Serial No. 136,436, now Patent 1,759,063, granted May 20, 1930, filed September 20, 1926, (a brief description of the essential features of which as regards its relationship to the instant application being given later in the instant application) particularly with reference to guiding the lateral swinging movement of the draw bar thereof. The invention has its principal field of utility in connection with tractors for the pulling of agricultural implements, such as drag harrows, disc harrows, cultivators, etc., and in the following description I shall describe the invention in this association with a tractor. It will be understood, however, that in its broader aspects, the invention also has application to other types of vehicles; as, for example, it may be employed for connecting successive trailers, a series of agricultural implements, and other combinations of pulling and pulled vehicles wherein the advantages of the present draft attachment are desired. Furthermore, its use is not restricted to the pulling vehicle, as it may also be employed on the pulled vehicle; or it may be employed in any situation where it is desired to guide or support a swinging draw bar against stresses acting at right angles to the plane of swinging movement.

In the above mentioned copending application I have disclosed a draft attachment characterized by a horizontally swinging draw bar having a virtual pivotal center located considerably forward with reference to the tractor, preferably intermediate the front and rear axles of the tractor. This is a "virtual" pivotal center as distinguished from an actual pivotal center, such relation being obtained by a novel arrangement of links which determine the pivotal movement of the draw bar and give the latter the effect of being pivoted to the tractor at this forward point without actually extending the draw bar to such point. The purpose of such draft attachment is to facilitate steering of the tractor under load and particularly around short turns, the location of the virtual pivot at such forward point overcoming the resistance to steering usually present with the ordinary draft attachment.

It frequently happens that in pulling different types of agricultural implements, and in traveling over uneven ground, the line of draft will pull upwardly or downwardly on the draw bar, thus tending to bind the free pivotal movement of the links, or even tending to bend the draw bar and links. It is the principal object of the present invention to provide improved mechanism functioning in the nature of guide means for holding the said draw bar in its plane of free swinging movement, such guide means resisting those stresses which tend to force the draw bar upwardly or downwardly under draft load. This improved means is substantially frictionless in its guiding action, thereby avoiding the very heavy friction attendance upon the use of fixed guide bars for resisting these vertically acting stresses. More specifically, the present guide means comprises an arrangement of links substantially similar to the arrangement of links which govern the horizontal swinging movement of the draw bar, the present arrangement of links being disposed, however, in a substantially vertical plane so as to resist the vertically acting stresses set up in the bar.

While the present arrangement of guide mechanism has been devised principally for use in connection with a draft attachment of the type disclosed in my copending application, the utility of these guide links is not limited to such draft attachments, but has equal applicability to any conventional type of draft mechanism characterized by a laterally swinging draw bar.

A further object of the invention is to provide improved lock mechanism cooperating with these guide links to lock the draw bar at a definite angle of draft, when such is desired.

Referring to the accompanying drawings illustrating a preferred embodiment of my invention:

Figure 1 is a plan view of a conventional design of tractor illustrated somewhat diagrammatically, and showing the present draft attachment secured thereto.

Fig. 2 is a similar view illustrating the draw bar in a centrally disposed position corresponding to a straight-back pull.

Fig. 3 is a fragmentary elevational view of the rear end of the tractor, and illustrating the position of the present guide linkage when the draw bar is in a laterally inclined position, as shown in Figure 1.

Fig. 4 is a view similar to Fig. 3, showing the position of the present guide linkage when the draw bar is extending straight back, as shown in Fig. 2.

Fig. 5 is a side elevational view illustrating the bracket mounting of the draft attachment, and Fig. 6 is a fragmentary detail view illustrating the pivotal connection between the guide linkage and the draw bar.

The tractor illustrated more or less diagrammatically in Figs. 1 and 2 is of any typical design, the details thereof having no particular relevancy to the present invention. The construction shown comprises the usual rear axle 7, rear drive wheels 8—8, the front axle 9 and the steering wheels 11—11. The two steering wheels 11—11 are illustrated as having pivotal support between forked ends of the axle 9, as in standard automobile practice, although the steering may, of course, be effected through swinging motion of the axle and wheels around a fifth wheel supported by the tractor frame.

The construction and operation of the present guide means will be better understood by first describing the draft mechanism of my copending application. This draft mechanism comprises a draw bar 14 of T-shape having a cross bar 15. Pivot bolts 16—16 in the ends of this cross bar, and preferably located equi-distantly from the center of the bar, connect the same to the ends of two links 17—17. These links extend outwardly and rearwardly from the pivots 16 and have pivotal attachment at their rear ends to brackets 18 suitably secured to the tractor. As shown in Fig. 5, the rear end of each link 17 has an upwardly turned pivotal portion 19 which extends through a vertical bearing boss 21 formed as a part of the bracket 18, and receives a cotter pin or any other suitable fastening device at its upper end to hold this link in its bearing boss. The brackets 18 may be secured to the tractor at any suitable point at the rear end thereof, but for the standard tractor design these brackets are preferably secured to the sides of the differential housing 23, Fig. 5 illustrating these brackets so attached to the lower part of the differential housing by bolts 24. The mounting of the brackets 18 at this low point on the differential housing enables the draw bar 14 to swing in a substantially horizontal plane directly below the housing, and also results in the links 17 carrying the draft load by straight line end thrust, which is desirable.

In the operation of this draft mechanism, the draw bar 14 will swing laterally with the varying angle of the line of draft as the tractor turns, as is true of any pivoted draw bar. However, by virtue of the swinging movement of the links 17, this lateral movement of the draw bar will be around a virtual pivot located considerably forward of the front end of the bar. This follows from the fact that the two pivot pins 16 on the draw bar are compelled to swing on separate arcs defined by the pivotal motion of the links 17, whereby one of the pivot points 16 moves forwardly while the other moves rearwardly in the transverse swing of the draw bar. The net result of this action is that the outer end of the bar is compelled to swing in a comparatively flat arc (or circular path corresponding substantially identically with a true arc) having an apparent center at a point considerably forward along the longitudinal central axis of the tractor. As described at length in my copending application, by thus applying the draft load along a line extending to this forward point, the resistance offered to turning of the tractor can be reduced to a minimum.

In pulling different types of agricultural implements, and in travelling over hummocks etc., there will be many instances when the line of draft will not be in direct prolongation of the draw bar 14, but will extend upwardly or downwardly relative thereto. In the absence of any guide means for restraining the draw bar, the latter will incline upwardly or downwardly to an undesired degree under the influence of this line of draft, with the result that the links 17 will be bound against free swinging movement, or, in the event of exceptional angularity of the line of draft, that the draw bar or links will be bent. In my copending application I have endeavored to avoid or alleviate this condition by providing a cross bar extending between the rear ends of the brackets 18, which cross bar serves as a fixed guide surface on which the draw bar slides in its lateral swinging movement. This cross bar serves as an adequate guide means for the draw bar in most instances, but where the line of draft is inclined at a particulary sharp angle downwardly, the friction of the draw bar bearing against the guide bar may be sufficient materially to interfere with the free swinging movement of the draw bar, such frictional resistance being increased by the presence of sand, dirt or rust on the contacting bar surfaces.

The present invention overcomes these objections by providing guide means for the draw bar which is pivotal in character, and hence operates with negligible friction under all conditions. More specifically, this guide means comprises a link mechanism operating in exact analogy to the link mechanism 17, but disposed in a vertical plane and so connected with the draw bar as to receive the vertically acting stresses set up in the draw bar. Two links 26—26 are disposed in a vertical plane directly in rear of the differential housing 23, having their upper ends converging and pivotally connected at 27 to the cross bar portion 28 of a T-shaped guide member 29, such guide member being substantially similar to the forward end of the draw bar 14. The divergent lower ends of the links 26 have horizontally bent portions 31 which are pivoted in bosses 32 formed integral with the mounting brackets 18, and preferably disposed outside of and at the lower ends of the vertical pivot bosses 21.

The lower end of the T-shaped guide member 29 has pivotal connection with the draw bar 14 through a pivot pin 33 and shouldered connecting member 34. As shown in Figs. 3 and 4, this connecting member comprises an enlarged upper portion 35 which is apertured to receive the horizontal pivot pin 33 extending through the lower end of the T-shaped guide member 29. This enlarged upper portion has a shoulder which bears against the top of the draw bar 14, and also has a depending pin portion extending through a hole 36 in the draw bar and receiving a nut, pin or the like 37 on its lower end below the draw bar. It will be seen from this construction that any upwardly acting stresses tending to swing the draw bar 14 upwardly will react against the shouldered upper portion 35 of the coupling member 34 and will be resisted through the guide member 29 and links 26. Similarly, any downwardly acting stresses tending to swing the draw bar downwardly will react against the stop surface 37 on the coupling member 34 and will likewise be resisted by the guide member 29 and links 26.

The links 17 establish a pivotal center for the draw bar 14 considerably in advance of the front end of the draw bar and the links 26 function in like manner to control the transverse swinging movement of the guide member 29 so that its lower end, where it is attached to the draw bar 14 through the coupling member 34, will be caused to swing substantially in an arc the radius of curvature of which is greater than the length of either of the supporting links 26. Preferably this arc is approximately flat, or a straight line, but it may curve slightly either up or down, depending on the relative dimensions and angularity of the parts of the linkage comprising the links 26 and guide member 29. If such arc curves upwardly toward its ends, the coupling member 34 may be said to swing about a pivotal center lying considerably above the plane of transverse movement of the draft bar, whereas if such arc be oppositely curved, such pivotal center would lie considerably below said plane. In either case, however, there will be no appreciable rise or fall of the coupling member 34, or of the draw bar, nor will there be any binding of the links 17 in the lateral movement of the draw bar. Irrespective of whether the line of draft is exerting an upward or a downward pull on the draw bar the linkage system 26—29 will carry such vertically acting stresses with negligible friction so that at no time is the horizontal swinging movement of the draw bar impeded because of the vertical angularity of the line of draft.

It is frequently desirable to lock the draw bar in a definite angular position, this being particularly true when backing an implement, at which time the swing of the draw bar might be a disadvantage. To this end I have provided locking means which cooperates with the guide linkage to hold the draw bar in a fixed position—preferably extending straight back from the tractor, as shown in Figs. 2 and 4. This locking means comprises a pair of swinging arms 39, mounted on a horizontal shaft 41, and adapted to engage over the opposite sides of the shank portion of the guide member 29 when the latter is in a vertical position. The shaft 41 is disposed in rear and toward the underside of the differential housing 23 having its end portions extending through bearing openings 42 in the side brackets 18. The central portion of the shaft also has bearing support in a bracket 43 which is suitably secured to the outer side of the differential housing, the locking arms 39 being pinned or otherwise secured to this shaft on the opposite sides of the bracket 43. One end of the shaft 41 is bent upwardly outside of the adjacent bracket 18, as indicated at 44, and this end carries a weight 45 thereon. The angle of this upwardly bent end is such that when it is swung to the rear of a vertical center line passing through the axis of the shaft, the locking arms 39 will be swung down to embrace the guide member 29, as indicated in full lines in Fig. 6, and when this bent end is swung to the forward side of such vertical center line the locking arms 39 will be swung upwardly to their clear position, as indicated in dotted lines in Fig. 6. The weighted end 45 of the arm 44, in passing over this vertical center line will hold the locking mechanism in either desired position. When the locking arms 39 are swung down to locking position, they engage lugs 46 formed as integral extensions of the bracket 43, such lugs limiting the movement of the locking arms in this direction. It will thus be seen that to lock the draw bar against swinging movement it is only necessary to swing the draw bar to the central position shown in Fig. 2, and thereafter throw the actuating arm 44 rearwardly to cause the locking arms 39 to embrace and lock the T-shaped guide member 29. The unlocking operation is performed by merely swinging the actuating arm 44 forwardly to its previous position. If desired, additional pairs of spaced locking arms 39 might be provided at different points along the shaft 41 for locking the guide member 29 in different angular positions, corresponding to laterally inclined positions of the draw bar 14. To avoid obscuring the drawings, the foregoing lock mechanism has not been illustrated in Figs. 1 and 2.

As I have before remarked, the present guide mechanism has been designed primarily for use in connection with a swinging draw bar of the type disclosed in my aforesaid copending application, but the utility of the present guide means is not necessarily limited thereto. For example, this construction of pivotal guide means might be employed on any laterally swinging draw bar having a direct pivotal connection to the tractor, in contradistinction to an indirect pivotal connection through the links 17—17.

What I claim as my invention and desire to secure by Letters Patent, is—

1. The combination with a vehicle, of draft mechanism therefor comprising a draw bar having free lateral swinging movement, and multiple link suspension means pivoted on a plurality of centers and connected to said draw bar between its ends for guiding the free lateral swinging movement thereof.

2. The combination with a vehicle, of draft mechanism therefor comprising a laterally swinging draw bar, and guide means supporting said draw bar to swing about a virtual pivot displaced vertically from the path along which the draw bar moves laterally.

3. The combination with a vehicle, of draft mechanism therefor comprising a laterally swinging draw bar, and link guide means connected to said draw bar and swinging around a virtual pivot displaced vertically beyond the ends of said guide link means.

4. The combination with a vehicle, of a draft attachment therefor comprising a draw bar, means pivotally supporting said bar to swing transversely about a virtual pivot disposed beyond one end of said bar, and means supporting said bar to swing about a virtual pivot displaced vertically from said bar.

5. The combination with a vehicle, of draft mechanism therefor comprising a draw bar having free lateral swinging movement, and laterally spaced bar links connected to said draw bar and to the vehicle to swing transversely thereof in a substantially vertical plane for resisting upwardly and downwardly acting stresses set up in said draw bar.

6. The combination with a vehicle, of draft mechanism therefor comprising a draw bar pivoted adjacent its forward end for free lateral swinging movement, and link mechanism pivoted at laterally spaced points to the vehicle and pivotally connected with said draw bar intermediate its ends, said link mechanism resisting vertically acting stresses set up in said draw bar.

7. The combination with a vehicle, of draft mechanism therefor comprising a laterally swinging draw bar, and a pair of laterally spaced links disposed in a substantially vertical plane above said draw bar and connected to the latter intermediate its ends for resisting vertically acting stresses set up in said draw bar.

8. The combination with a vehicle, of a draft attachment therefor comprising a laterally swinging draw bar, a guide member pivotally connected to said draw bar and extending substantially at right angles to the plane of the swinging movement of said draw bar, and guide links connected to said guide member.

9. The combination with a vehicle, of a draft attachment therefor comprising a laterally swinging draw bar, a T-shaped guide member pivotally connected to said draw bar and extending upwardly therefrom, and links pivotally connected to the cross bar portion of said T-shaped guide member and to said vehicle.

10. The combination with a vehicle, of a draft attachment therefor comprising a laterally swinging draw bar, a T-shaped guide member extending in a substantially vertical plane above said draw bar, pivotal coupling means for connecting said T-shaped member to said draw bar intermediate the ends of the latter, and links pivotally connected to the cross bar portion of said T-shaped member and extending downwardly and outwardly therefrom for pivotal connection with said vehicle.

11. The combination with a vehicle, of a draft attachment therefor comprising a draw bar, means supporting said draw bar for movement transversely of the vehicle around a pivotal center in advance of the forward end of said draw bar, and a guide link associated with said draw bar and extending upwardly therefrom for resisting vertically acting stresses set up therein.

12. The combination with a vehicle, of a draft attachment therefor comprising a draw bar, means pivotally supporting said bar to swing transversely about a virtual pivot disposed beyond one end of said bar, and vertically extending pivotal guide means associated with said draw bar for resisting vertically acting stresses set up in the draw bar.

13. The combination with a vehicle, of draft means therefor comprising a laterally swinging draw bar, a pair of horizontally extending links pivotally mounted at their ends on spaced pivots carried by said vehicle and having their opposite ends pivotally connected to transversely spaced pivots carried by said draw bar, a pair of vertically extending links pivotally mounted at their lower ends on spaced pivots carried by said vehicle, and means pivotally connecting the upper ends of said links with said draw bar.

14. The combination with a tractor having a differential housing, of a draft attachment therefor comprising two brackets bolted to the sides of said housing adjacent the bottom thereof, vertically extending pivot bosses formed on said brackets, links having upwardly turned rear ends journaled in said pivot bosses, a T-shaped draw bar extending rearwardly from said tractor below said differential housing, said links converging and having a pivotal connection with the cross bar portion of said T-shaped draw bar, a T-shaped guide member disposed in a substantially vertical plane in rear of said differential housing, a pivotal coupling member connecting the lower end of said guide member to said draw bar, horizontally extending pivotal bosses formed on said brackets, and links having horizontally turned lower ends journaled in said latter bosses, the upper ends of said links converging and being pivotally connected to the cross bar portion of said T-shaped guide member.

15. The combination with a vehicle, of draft mechanism therefor comprising a laterally swinging draw bar, an upwardly extending guide member pivotally connected to said draw bar, links pivotally connected to said guide member and receiving vertically acting stresses imposed on said guide member from said draw bar, and lock mechanism adapted to hold said guide member against lateral movement.

16. The combination with a vehicle, of draft mechanism therefor comprising a laterally swinging draw bar, link mechanism for guiding the swinging movement of said draw bar, and pivotally mounted lock mechanism adapted to be moved into and out of engagement with said link mechanism for preventing such swinging movement of the draw bar.

17. The combination with a vehicle, of draft mechanism therefor comprising a laterally swinging draw bar, a vertically extending guide member pivotally connected to said draw bar for receiving vertical stresses set up in said draw bar, and locking means adapted to embrace said guide member for holding said draw bar at a definite angular position.

18. The combination with a vehicle, of draft mechanism therefor comprising a laterally swinging draw bar, a laterally moving guide member connected to said draw bar for guiding the movement of the latter, a pair of locking arms pivotally supported on the vehicle and adapted in one position to engage the sides of said guide member, and a weighted actuating arm connected to said locking arms and adapted to be thrown over center in moving said locking arms to their operative or inoperative positions.

19. In combination, a vehicle, a laterally swinging draw bar associated therewith, and a pair of links cooperating with said draw bar for carrying the vertically acting stresses set up in said bar, said links having their ends pivotally connected with said vehicle at laterally spaced points to swing transversely thereof about longitudinally extending axes, the opposite ends of said links being spaced apart, and means pivotally connecting the latter ends of said links with said draw bar, whereby the pivotal movement of said links confines the lateral swinging of said draw bar substantially to a straight line movement.

20. In combination, a vehicle, a laterally swinging draw bar associated therewith, a pair of links having their lower ends pivotally connected with said vehicle at laterally spaced points, and a suspension member pivotally connected between the upper ends of said links and operatively connected with said draw bar.

21. The combination with a vehicle, of a draft attachment therefor comprising a draw bar, means pivotally supporting said bar to swing transversely about a virtual pivot disposed beyond the forward end of said bar, and means supporting said bar to swing about a virtual pivot displaced from said bar, said latter supporting means guiding said bar to swing approximately in a horizontal plane.

22. The combination with a vehicle, of a draft attachment therefor comprising a draw bar, and a pair of vertically extending links for supporting said draw bar so that it swings in an arc in its lateral movement, the radius of curvature of said arc being greater than the length of either of said supporting links.

23. The combination with a vehicle, of a draft attachment therefor comprising a laterally swinging draw bar, a guide member pivotally connected to said draw bar and extending substantially at right angles to the plane of the swinging movement of said draw bar, guide links connected to said guide member, and lock mechanism for holding said draw bar against swinging movement.

WILLIAM L. PAUL.